United States Patent [19]

Alfrey

[11] Patent Number: 4,564,505

[45] Date of Patent: Jan. 14, 1986

[54] PROCESS AND APPARATUS FOR SIMULTANEOUS MATERIAL GRANULATION AND CLASSIFICATION

[76] Inventor: Norval K. Alfrey, Rte. 9, Box 143B, Lake City, Fla. 32055

[21] Appl. No.: 587,890

[22] Filed: Mar. 9, 1984

[51] Int. Cl.⁴ .............................................. B01J 8/10
[52] U.S. Cl. .................................... 422/209; 432/112; 34/137
[58] Field of Search ............ 23/302 A, 313 P, 313 R, 23/295 R; 264/117; 165/88; 432/112, 113, 118, 81, 82; 34/137, 142; 71/64.05, 64.03; 422/209

[56] References Cited

U.S. PATENT DOCUMENTS

| | | | |
|---|---|---|---|
| 2,830,386 | 4/1958 | Magnusson | 165/88 |
| 2,860,598 | 11/1958 | Loesche | 71/64.05 |
| 3,030,657 | 4/1962 | Von Reppert | 23/313 P |
| 3,097,833 | 7/1963 | Harris et al. | 432/113 |
| 3,335,456 | 8/1967 | Teruo Oya et al. | 23/313 P |
| 3,345,683 | 10/1967 | Eirich et al. | 23/313 P |
| 3,408,169 | 10/1968 | Thompson et al. | 23/302 A |
| 3,805,406 | 4/1974 | Castonoli | 165/88 |

FOREIGN PATENT DOCUMENTS 2436863  2/1975  Fed. Rep. of Germany .... 23/313 P

Primary Examiner—Hiram H. Bernstein
Attorney, Agent, or Firm—William David Kiesel

[57] ABSTRACT

A process and apparatus for simultaneous feedstock material granulation and classification are provided which utilize applied heat to cause feedstock material to agglomerate, forming a uniformly sized granular product. The feedstock is fed onto a tilted rotating granulator-classifier, forming a moving bed of feedstock. Hot streams of combustion products or other heated gases are applied to a portion of the granulator-classifier and heat is thus percolated through the moving bed of feedstock. The feedstock is heated to a point wherein it begins to soften, or sinter. As the heated particles cascade downward over the granulator-classifier, the smaller particles adhere to the larger particles forming hardened, uniform granules which spill out of the granulator-classifier when they reach a desired size. The granulator-classifier may be provided with annular tiers which cause an increased efficiency in the uniform sizing of the granules as well as the agglomeration process. In an optional energy saving embodiment of the invention, waste heat from the granular product is recycled to preheat the feedstock.

3 Claims, 8 Drawing Figures

PROCESS AND APPARATUS FOR SIMULTANEOUS MATERIAL GRANULATION AND CLASSIFICATION

BACKGROUND OF THE INVENTION

1. Field of the Invention

This invention relates generally to the production of uniformly sized granular products and, more particularly, to the formation of granules from raw fertilizer product.

2. Prior Art

It has become a standard in the fertilizer industry that dry, solid fertilizer materials be in granular form. This requirement has come about primarily because raw product fertilizers have a tendency to cake and create dust. Caking is wasteful and presents difficulty in handling. Dusts are also wasteful and can create a pollution hazard. Also, in order to accurately and efficiently mix nutrients, uniform granulation is essential.

In the past, two methods have generally been employed for dry formation of granules: (1) crystallization, or (2) compaction. This is especially true for certain desirable primary fertilizer nutrients, such as muriate of potash or sulfate of potash. The crystallization process is extremely expensive and requires that the product be dried once it is crystalized. The compaction process is less costly than crystallization, but remains very expensive. The compaction process requires large expenditures for energy, maintenance and, in many instances, for additives. The compaction process also yields granulated products which are prone to decrepitation, moisture affinity and dusting.

Certain fertilizer materials such as ammonium sulfate cannot be granulated satisfactorily or economically on a commercial scale by compaction. Recent attempts to do so have failed because of high pressure requirements, inability to maintain the compactors and poor product quality (tendency to decrepitate, pick up moisture and cake).

This result has left crystallization as the only commercially acceptable solution for ammonium sulfate granulation. The crystallization process, as stated above, is capital intensive and requires expensive follow-up drying operations. The crystallization process has also resulted in the formation of a requisite amount of fine particles which heretofore have been discarded due to the inability to economically transform them into a saleable granular form.

The use of additives to aid in the granulation process has resulted in increased product costs as well as dilution of the product. Also, "wet" granulation techniques are required when additives are introduced, thus also requiring expensive drying operations. Poor product quality has resulted from the use of "wet" techniques. More particularly, the product is subject to decrepitation during transferring operations and in humid environments.

Some attempts at thermal granulation have been made. These attempts have involved the use of rotary drums, kilns, paddle shaft pugging devices, blungers, and the like. These attempts, as those listed previously, have failed to produce an economically feasible quality product.

Examples of prior attempts at granulation may be found in U.S. Pat. Nos. 3,362,989 and 2,944,878. These patents utilize sublimation routes in order to obtain crystal modifications.

All of the above mentioned processes require that the product be passed through a screening process for classification of acceptable granules of a uniform size and rejection of all others. This is an additional expense, requiring additional equipment and wasting a significant amount of product.

SUMMARY OF THE INVENTION

Therefore, it is an object of this invention to provide an apparatus and a process for simultaneously granulating and classifying dry feedstock.

It is another object of this invention to provide such an apparatus and a process in which drying and screening operations are unnecessary.

It is a further object of this invention to provide such an apparatus and a process which produce a commercially acceptable, relatively low cost, high quality granular fertilizer product from ammonium sulfate, muriate of potash, sulfate of potash, urea, ammonium nitrate, sulfur, ammonia phosphates, ammonia polyphosphates, other phosphatic fertilizers, combinations of these materials and virtually all other solid fertilizer materials.

It is still another object of this invention to provide such an apparatus and a process which save energy and thus result in a lower cost product to the consumer.

Still further objects and advantages of this invention shall become apparent from the ensuing descriptions of the invention.

Accordingly, a process and apparatus for producing uniformly sized granular material are provided which utilize applied heat to cause feedstock material to agglomerate, forming a uniformly sized granular product. The feedstock is fed onto a tilted rotating granulator-classifier, forming a moving bed of feedstock. Hot streams of combustion products or other heated gases are applied to a portion of the granulator-classifier and heat is thus percolated through the moving bed of feedstock. The feedstock is heated to a point wherein it begins to sinter. As the heated particles cascade downward over the granulator-classifier, smaller particles adhere to larger particles forming hardened, uniform granules which spill out of the granulator-classifier when they reach a desired size. The granulator-classifier may be provided with annular tiers which cause a dramatic increased efficiency in the uniform sizing of the granules as well as the agglomeration process. In an optional energy saving feature, waste heat from the granular product is recycled through a double tube heat exchanger, a trough heat exchanger, or both, to preheat the feedstock.

DESCRIPTION OF PREFERRED EMBODIMENTS OF THE INVENTION

Process

Figure 1:
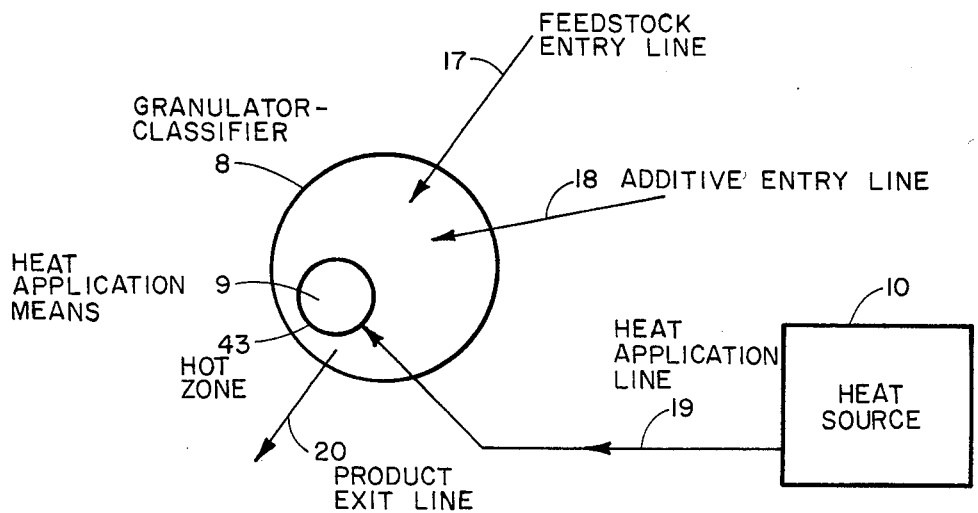
FIG. 1 illustrates a preferred embodiment of the process of this invention.

One of the processes of the invention is shown in FIG. 1. A continuous stream of material (feedstock) to be granulated is fed onto a rotary granulator-classifier 8 through feedstock entry line 17. The granulator-classifier 8 is tilted at an acute angle with horizontal (see FIG. 3) and is constantly rotated by a power means 12 such that a rotational bed of feedstock cascades over the circular floor 15. A heat source 10 produces hot combustion gases or other hot gases which are transferred by a heat application line 19 to a heat application means 9, which in turn applies heat to a portion of the moving bed of feedstock. For control purposes, heat must be applied in small finger-like streams, preferably at a plurality of application points near the floor 15 of the granulator-classifer 8, such that heat is allowed to percolate upward through the feedstock. In a less preferred embodiment, heated gases may be impinged into the bed of feedstock from above the bed rather than near the floor 15. Additional heat may be applied by releasing the actual combustion flame directly into the moving bed, preferably deeply below the bed surface and near the floor 15 in order to gain the advantage of a highly efficient heat transfer into the bed material. The feedstock on the granulator-classifier 8 thus passes through a hot zone 43 where it is heated to a point (usually within 10° F. to 100° F. of its fusion point) wherein it becomes soft and begins to sinter. The rotating and cascading action created by the granulator-classifier 8 (see FIGS. 5 and 6) causes the coarser particles to flow toward the surface of the bed of feedstock and the periphery of the granulator-classifier 8 and the smaller particles to flow toward the floor 15. The smaller particles of feedstock, having a larger surface to mass ratio than larger particles, will sinter before the larger particles and adhere to the surface of the larger particles as the cascading action takes place. As the particles pass out of the hot zone 43 they cool and harden. It has been found that by varying the amount of heat applied, the volume of the granulator-classifier 8, the extent of dispersion of applied subsurface heat, the temperature differential between the subsurface heat applied and the moving bed particles, the rate of feed, the angle of tilt of the granulator-classifier 8, and the speed of rotation, various uniform sizes of granules can be produced. As the granules agglomerate and reach a desired uniform size they will spill over the outer wall 16 of the granulator-classifier 8 and be carried away by a product exit line 20.

It has been discovered that by adding a plurality of annular tiers 36 (see FIG. 3) to the floor 15 of the granulator-classifier 8, the process becomes more efficient. This tiered configuration causes the finer particles to agglomerate on one tier until they are large enough to migrate to the next higher tier, etc. until they reach the desired granule size. The tiers 36 have the effect of transplanting smaller particles off of the floor 15 and onto larger particles. The tier arrangement is particularly important when the feedstock is a material such as ammonium sulfate, which tends to decompose upon sintering. Smaller particles are transferred onto larger particles before significant decomposition can occur. At this point, the product granules will tend to cascade over the smaller agglomerating particles and eventually exit the granulator-classifier 8 over its outer wall 16.

The process can be operated with only one piece of apparatus performing the function of a granulator and a classifier, eliminating the necessity for expensive driers and classifying screens. The granular product produced by this invention is much harder, more uniform and of a much higher quality than that produced by prior art processes and devices.

Additives may be applied through additive entry line 18 to the granulator-classifier 8 in order to increase fluidity for quicker granulation. These additives may be in the form of a flux or of a reactant which reacts with the feedstock to create a relatively small amount of reaction product having a lower melting or sintering point than the feedstock alone. The additive may, by its own lower sintering point, create the necessary fluidity for increased agglomeration efficiency. This is the case when a constant stream of finely crushed additive material is introduced through feedstock entry line 18. The smaller particles will then sinter and coat the larger particles. Also, combinations of fertilizer materials may be utilized as feedstock, in which case the temperature required for agglomeration/granulation may be a eutectic point or may be the temperature of the ingredient with the lowest sintering point.

The process of this invention performs superbly when melts or slurries such as ammonium nitrate melts, ammonia polyphosphate melts, ammonia phosphate melts or urea melts are fed onto the granulator-classifier 8. The melts can be added with or without small amounts of water to assure the fluidity of the melt-type feedstock. The overall moisture content should be kept as low as possible in order to assure complete drying during the agglomeration/classification process. Of course, conventional drying means may be employed should an increased moisture content be desired.

Figure 2:
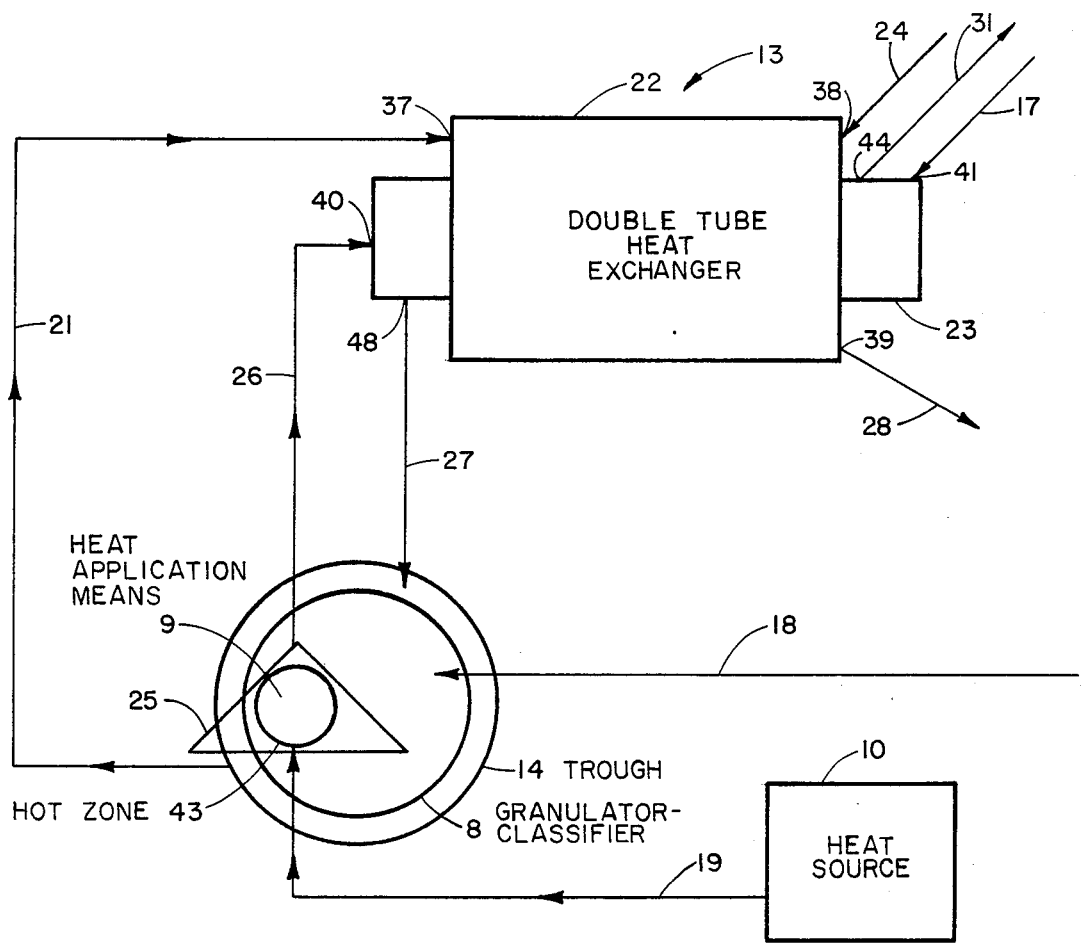
FIG. 2 illustrates another preferred embodiment of the process of this invention.

In a preferred embodiment of the process of this invention, shown in FIG. 2, the feedstock is preheated, utilizing waste heat from the agglomeration process. The hot product granules are carried by a hot product transfer means 21 (such as a conventional conveyor system) to a double tube heat exchanger 13. The hot product granules pass through hot product entry port 37 into a rotating outer tube 22 wherein they are cascaded against a rotating inner tube 23. Cooled product granules exit through cooled product exit port 39 and are carried to storage by cool product exit means 28. Feedstock enters the inner tube 23 of double tube exchanger 13 through feedstock entry port 41. As the feedstock passes through inner tube 23 it receives heat from the hot product in the outer tube 22. The feedstock is also heated by the waste hot gases from the granulator-classifier. Hood means 25 collects the hot gases from the granulator-classifier 8 wherein they are carried through hot gas recycle line 26 and into inner tube 23 at hot gas entry port 40. Also, ambient air is drawn through ambient air entry line 24 and through ambient air entry port 38. The air circulates through the hot product granules and enters inner tube 23 through air intake louvers 34 (see FIG. 7), transferring additional heat to the feedstock. Exhaust gases exit inner tube 23 through the exhaust gas exit port 44 and into cooled gas exit line 31 after flowing across the feedstock. As can be seen, the direction of ambient air flow and hot waste gas flow is opposite to the flow of particles from which or to which heat is transferred preheated feedstock exits through exit port 48 and passes into inner tube 23 preheated feedstock transfer means 27.

The preheated feedstock can then be transferred directly to the granulator-classifier 8 or be preheated a second time. As shown in FIG. 2, the preheated feedstock may be transferred by preheated feedstock transfer means 27 to an annular trough 14, affixed to the outer wall 16 of the granulator-classifier 8. The trough 14 is more clearly shown in FIG. 3. As can be seen, the trough 14 will receive hot product as it exits over outer wall 16. The feedstock enters trough 14 and comingles with the hot product granules, receiving heat therefrom. A stationary plow 30, held in place by support 45, scoops material from the rotating trough 14 and transfers the material onto the granulator-classifier 8. Any product granules scooped by plow 30 will cascade immediately to the outer wall 16 and re-enter trough 14. Granular product will spill out of trough 14 as it fills and will be transferred by hot product transfer means 21 to the double tube heat exchanger 13. The double tube heat exchanger 13 may be used alone or in conjunction with the trough 14. Conversely, the trough 14 may also be used alone as a heat exchange means. Of course, conventional heat exchange means may also be employed in the processes of this invention.

Apparatus

Figure 3:
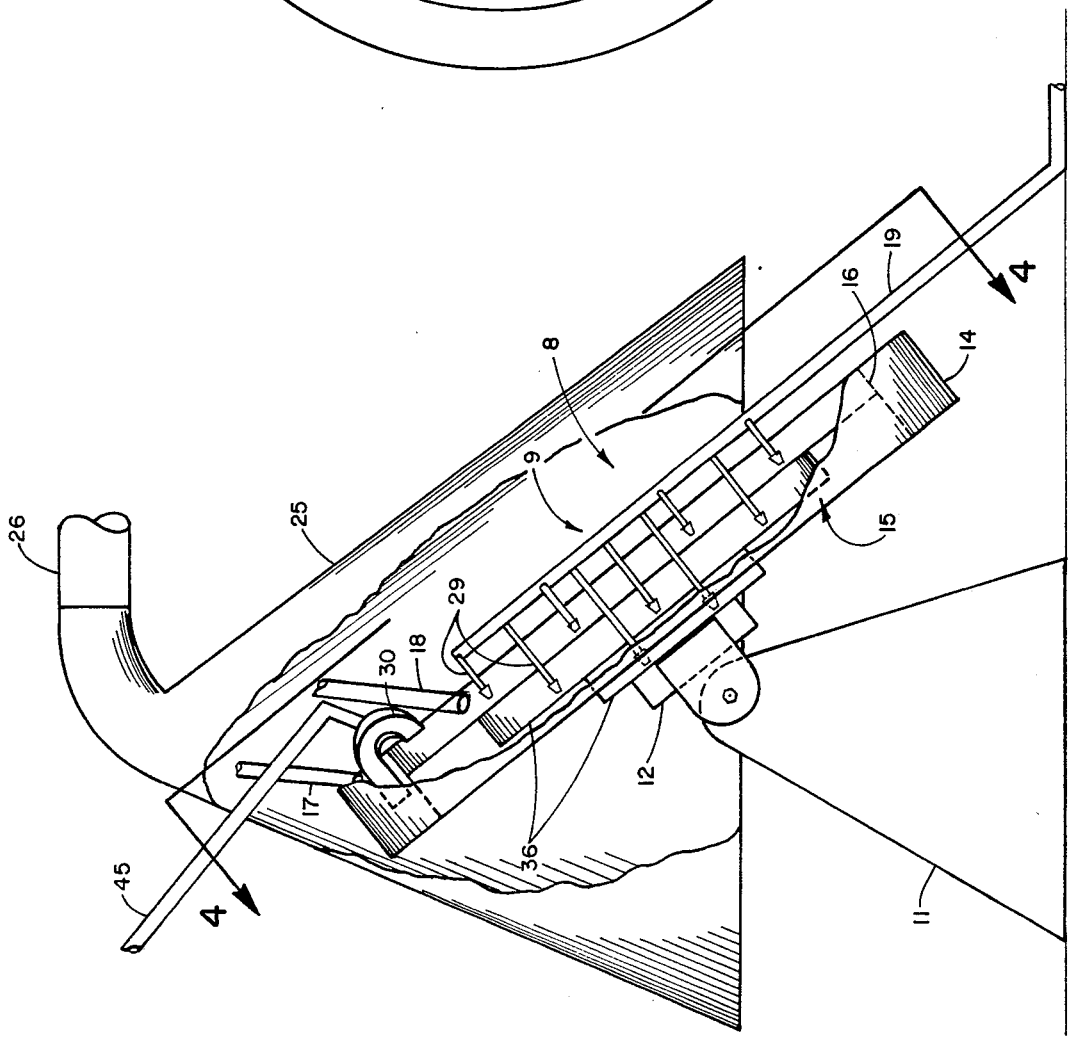
FIG. 3 illustrates a sectional side view of a preferred embodiment of the apparatus of this invention.

The basic apparatus of this invention comprises a rotary granulator-classifier 8 having a circular floor 15. In the preferred embodiment shown in FIG. 3, the floor 15 has annular tiers 36 which greatly facilitate agglomeration and classification, especially of fertilizer products such as ammonium sulfate. The heat application means 9 is shown in FIG. 3 comprising a group of stationary nozzles 29 directed at a portion of the floor 15. As stated above, it is preferred that the nozzles 29 be located near the floor 15, thus imbedded in the moving feedstock, so that heat is allowed to percolate up through the feedstock as it moves across the floor 15. The nozzles 29 may also be positioned above the moving bed of feedstock, such that heat is impinged downward into the feedstock.

Figure 4:
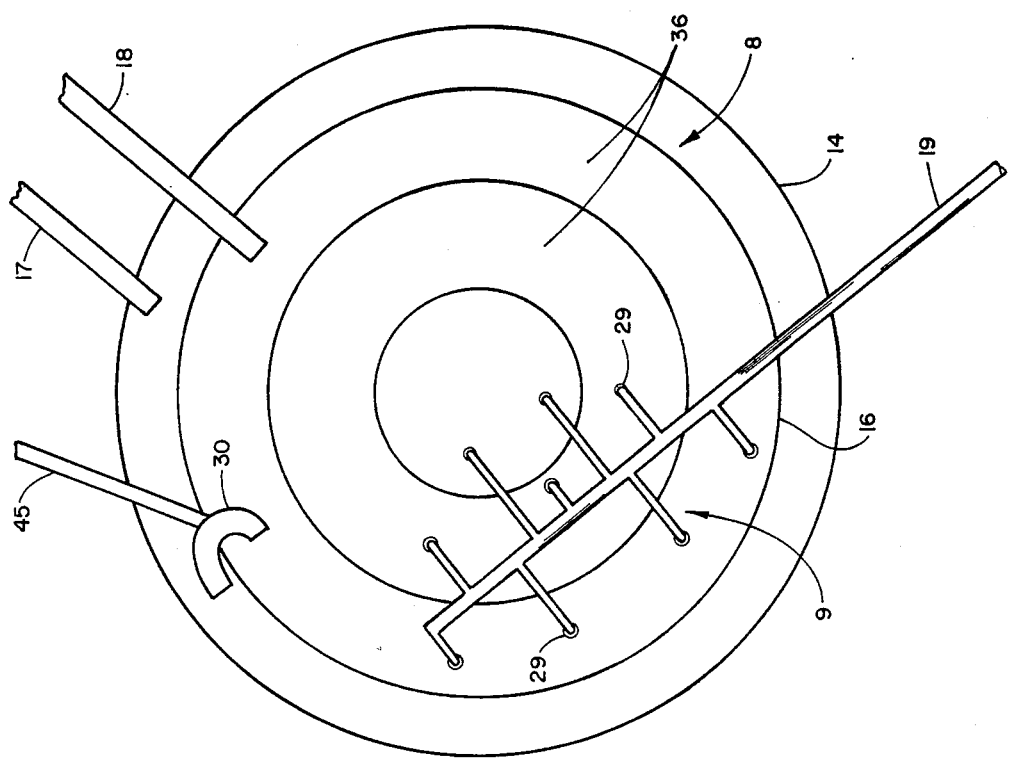
FIG. 4 illustrates a view along line 4—4 of FIG. 3.

A power means 12 is provided for rotating the granulator-classifier 8 at a desired speed. The granulator-classifier 8 is pivotally and rotatably attached to stationary base 11. The tilt angle of the granulator-classifier 8 may thus be varied as desired. Feedstock is fed onto the granulator-classifier 8 by feedstock entry line 17. Since, in the embodiment shown in FIG. 4, the trough 14 is being employed as a heat exchange means, the feedstock is fed directly into trough 14. If trough 14 is not utilized, the feedstock would be fed directly onto the granulator-classifier 8. Additive entry line 18 always empties directly onto the granulator-classifier 8. When the trough 14 is employed as a heat exchange means, at least one stationary plow 30 is used to transfer material from the trough 14 over the outer wall 16 and onto the granulator-classifier 8. More plows 30 may be employed depending upon desired flow rates. The plow 30 is held fixedly in place by conventional means, such as support 45. Additional stationary plows may be positioned over the granulator-classifier to transfer material from one side of the granulator-classifier 8 to the other, to aid in the mixing of particles in the moving bed.

Should another heat exchange means, such as the double tube heat exchanger 13, be employed, hood means 25 may be used to collect waste hot gases from the granulator-classifier 8.

Figure 6:
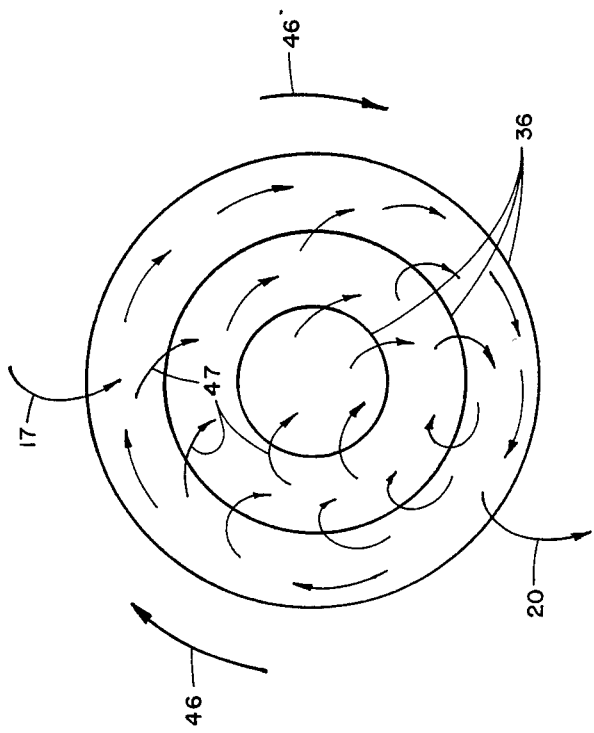
FIG. 6 illustrates the material flow from a view along line 6—6 of FIG. 5.
Figure 5:
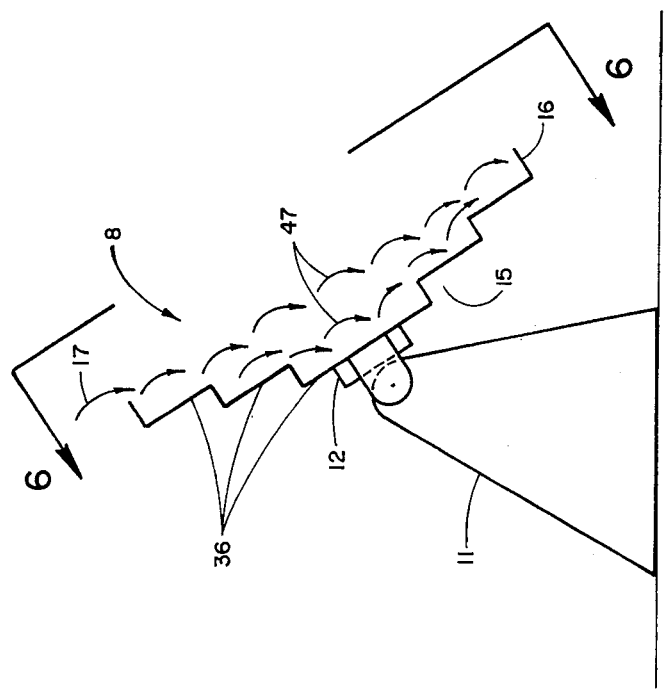
FIG. 5 illustrates the material flow of a preferred embodiment of the invention.

Flow diagrams in FIGS. 5 and 6 depict material flow on the granulator-classifier 8. The preferred point of feedstock entry is shown by feedstock entry line 17. Arrows 46 indicate the direction of rotation. For the shown direction of rotation, direction of flow arrows 47 indicate the action imparted to feedstock particles and granules as they cascade over the granulator-classifier 8. Fully formed product granules of the desired size will tend to move toward the outer wall 16 and away from the flow 15, spilling out into product exit line 20, while other particles will continue to agglomerate until they form product granules.

Figure 8:
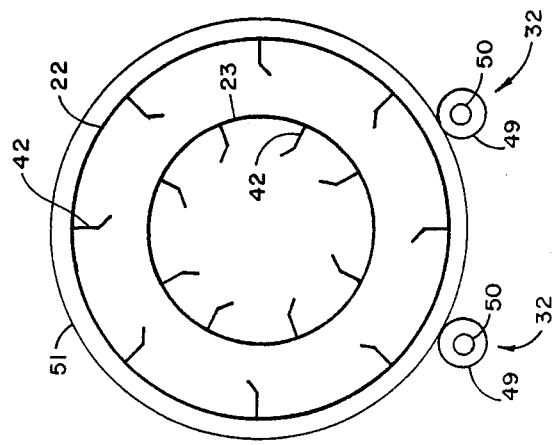
FIG. 8 illustrates a sectional view of the double tube heat exchanger of the invention taken along line 8—8 of FIG. 7.
Figure 7:
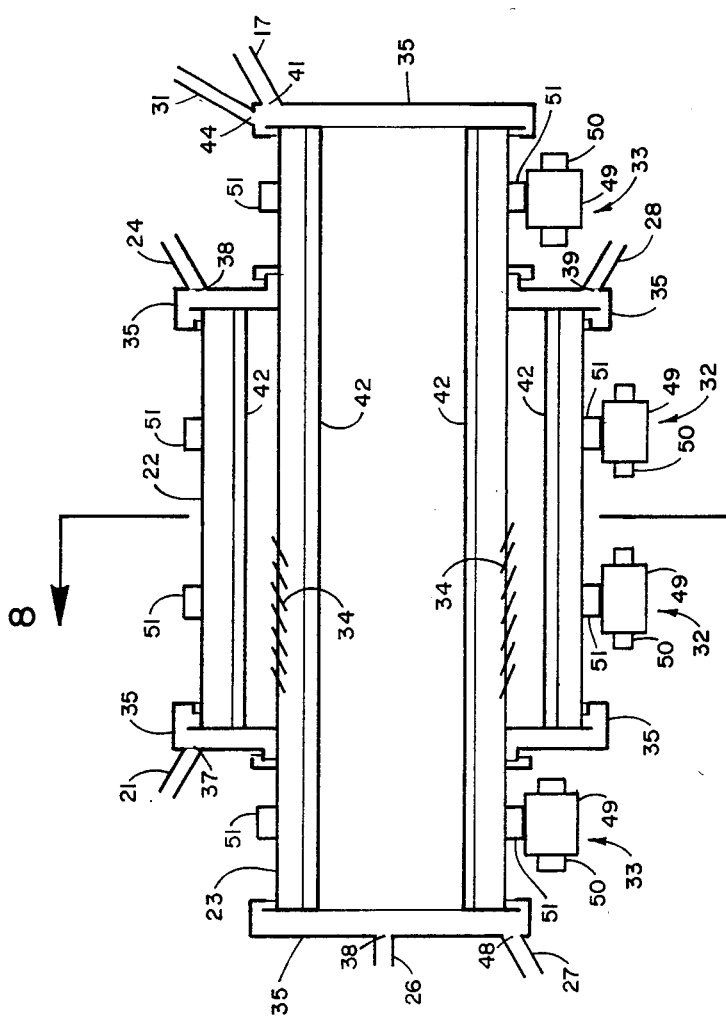
FIG. 7 illustrates a sectional diagramatic view of the double tube heat exchanger of the invention.

FIG. 7 depicts a sectional view of the double tube heat exchanger 13 of this invention. Outer tube 22 is rotated by outer tube rotation means 32 and rotates relative to inner tube 23, which is rotated by inner tube rotation means 33. Rotation means 32 and 33 may comprise conventional rotation apparatus such as the shaft 50 and trunnion 49 arrangement shown, wherein the trunnions 49 operate as a friction drive against tires 51. Recycled product granules are returned to the outer tube 22 by hot product transfer means 21 and enter through hot product entry port 37. The product granules are dispersed as they flow through the outer tube 22 by flight means 42 (see also FIG. 8), which cause the granules to cascade off of the inner tube 23, transferring heat to the inner tube 23 and eventually to the feedstock flowing through the inner tube 23. Cooled product exits through cooled product exit port 39 into cooled product exit means 28, which carries the cooled product to storage by conventional means, such as conveyors. Hot gases captured by hood means 25 are channeled through hot gas recycle line 26 into hot gas entry port 38 so as to flow against the flow of feedstock and further preheat the feedstock. Additional preheating is supplied by ambient air which is drawn through ambient air entry line 24 by conventional means, such as a suction fan, and into outer tube 22 through ambient air entry port 38, where it absorbs heat from the flow of hot product granules. Louvers 34 allow the heated air to flow into inner tube 23 but prevent product granules from entering inner tube 23. Spent heating gases and air are exhausted through cooled gas exit port 44 into cooled gas exit line 31. Feedstock enters inner tube 23 through feedstock entry port 41 and is dispersed for preheating by flight means 42. Preheated feedstock exits inner tube 23 through preheated feedstock exit port 48 and into preheated feedstock transfer means 27. The ends of inner tube 23 and outer tube 22 are sealed by stationary breeching 35.

As can be seen, the invention embodied herein will simultaneously agglomerate and classify feedstock material so as to obtain a granular product of a preferred size, eliminating the need for expensive driers and classifying screens. The invention utilizes waste heat to preheat feedstock, resulting in increased energy efficiency. Also, the quality of the product produced by this invention far exceeds that of the prior art. Many materials, such as ammonium sulfate, which were heretofore difficult to granulate, may be efficiently granulated into a quality product by this invention. Of course, there are many other alternate embodiments not specifically described, but which are intended to be included within the scope of this invention, as defined by the following claims.

I claim:

1. An apparatus for simultaneous feedstock material granulation and classification, comprising:
   (a) a rotary granulation-classifier having a circular floor having a plurality of annular tiers an annular outer wall, pivotally and rotatably attached to a stationary base and titled at an acute angle maintained between 36° and 44° to horizontal;
   (b) a stationary base having an upper end and a lower end, fixedly attached to a surface at said lower end and rotatably and pivotally attached to said granulator-classifier at said upper end;
   (c) a power means, connected to said granulator-classifier, for rotating said granulator-classifier at a desired speed;
   (d) a heat application means comprising a plurality of nozzles fixedly positioned at a desired distance from a portion of said floor of said granulator-classifier, for directing heated gases into a portion of said granulator-classifier as said granulator-classifier rotates;
   (e) a heat exchange means connected to a preheated feedstock transfer means, for preheating feedstock material prior to introduction of said feedstock material into said granulator-classifier;
   (f) a preheated feedstock transfer means, connected between said heat exchange means and said granulator-classifier, for transferring said feedstock material from said heat exchange means to said granulator-classifier; and wherein said heat exchange means comprises an annular trough, rectangular in section, fixedly attached to said outer wall of said granulator-classifier; and said preheated feedstock transfer means comprises at least one stationary transfer plow means, positioned between said trough and said granulator-classifier, for scooping said feedstock from said trough and transferring said feedstock over said feedstock said outer wall into said granulator-classifier.

2. An apparatus for simultaneous feedstock material granulation and classification, comprising:
   (a) a rotary granulator-classifier having circular floor having a plurality of annular tiers and an annular outer wall, pivotally and rotatably attached to a stationary base and tilted at an acute angle maintained between 36° and 44° to horizontal;
   (b) a stationary base having an upper end and a lower end, fixedly attached to a surface at said lower end and rotatably and pivotally attached to said granulator-classifier at said upper end;
   (c) a power means, connected to said granulator-classifier, for rotating said granulator-classifier at a desired speed;
   (d) a heat application means comprising a plurality of nozzles fixedly positioned at a desired distance from a portion of said floor of said granulator-classifier, for directing heated gases into a portion of said granulator-classifier as said granulator-classifier rotates;
   (e) a heat exchange means connected to a preheated feedstock transfer means, for preheating feedstock material prior to introduction of said feedstock material into said granulator-classifier; and
   (f) a preheated feedstock transfer means, connected between said heat exchange means and said granulator-classifier, for transferring said feedstock material from said heat exchange means to said granulator-classifier; and
   (g) a hot product transfer means, connected between said granulator-classifier and said heat exchange means, for transferring hot product from said granulator-classifier to said heat exchange means; and wherein said heat exchange means comprises:
      (i) an outer tube, rotatably and sealingly positioned around an inner tube, having a hot product entry port, said hot product entry port being connected to said hot product transfer means; an ambient air entry port; flight means, positioned inside said outer tube, for mixing and aerating said hot product within said outer tube; and cooled product exit port;
      (ii) an inner tube, rotatingly and sealingly positioned inside said outer tube, having a hot gas entry port connected to a hot gas recycle line, a feedstock entry port; a preheated feedstock exit port connected to said preheated feedstock transfer means, a cooled product exit port; flight means, positioned inside said inner tube, for mixing and aerating said hot feedstock within said inner tube; and louver means positioned between said inner and outer tubes, for transferring heated air from said outer tube to said inner tube;
      (iii) an outer tube rotation means, connected to said outer tube, for rotating said outer tube relative to said inner tube;
      (iv) an inner tube rotation means, connected to said inner tube, for rotating said inner tube relative to said outer tube;
      (v) a hood means, fixedly positioned over said granulator-classifier, for collecting and transferring hot waste gases from said granulator-classifier to said inner tube; and
      (vi) a hot gas recycle line connected between said hood means and said hot gas entry port.

3. An apparatus according to claim 2, wherein said heat exchange means further comprises:
   (vii) an annular trough, rectangular in section, fixedly attached to said outer wall of said granulator-classifier; and
   (viii) at least one stationary transfer plow means, positioned between said trough and said granulator-classifier, for scooping said feedstock from said trough and transferring said feedstock over said outer wall into said granulator-classifier.

* * * * *